United States Patent
Nemesh et al.

(10) Patent No.: US 10,247,149 B2
(45) Date of Patent: Apr. 2, 2019

(54) CONDENSATION CONTROL SYSTEM FOR INTERNAL COMBUSTION ENGINE

(71) Applicant: GM GLOBAL TECHNOLOGY OPERATIONS LLC, Detroit, MI (US)

(72) Inventors: Mark D. Nemesh, Troy, MI (US); Werner Filsinger, Wiesbaden (DE); Kai Becker, Oftersheim (DE)

(73) Assignee: GM Global Technology Operations LLC, Detroit, MI (US)

(*) Notice: Subject to any disclaimer, the term of this patent is extended or adjusted under 35 U.S.C. 154(b) by 325 days.

(21) Appl. No.: 15/175,089

(22) Filed: Jun. 7, 2016

(65) Prior Publication Data

US 2017/0350353 A1 Dec. 7, 2017

(51) Int. Cl.
| | | |
|---|---|---|
| *F02B 29/04* | (2006.01) | |
| *F02M 35/10* | (2006.01) | |
| *F02M 26/04* | (2016.01) | |
| *F02B 37/12* | (2006.01) | |
| *F02M 31/20* | (2006.01) | |

(52) U.S. Cl.
CPC ....... *F02M 35/10157* (2013.01); *F02B 37/12* (2013.01); *F02M 26/04* (2016.02); *F02M 31/205* (2013.01)

(58) Field of Classification Search
CPC .............................. F02B 29/04; F02B 29/0493
USPC ............................................................. 60/599
See application file for complete search history.

(56) References Cited

U.S. PATENT DOCUMENTS

| | | | | |
|---|---|---|---|---|
| 2013/0263828 A1* | 10/2013 | Cockerill | ............ | F02B 29/0418 123/540 |
| 2014/0150756 A1* | 6/2014 | Smith | .................. | F02M 31/205 123/563 |
| 2015/0345371 A1* | 12/2015 | Russ | ....................... | F02B 37/12 123/542 |
| 2017/0009642 A1* | 1/2017 | Kurtz | .................. | F02B 29/0493 |
| 2017/0051659 A1* | 2/2017 | Banker | ............... | F02B 29/0418 |

* cited by examiner

*Primary Examiner* — Ngoc T Nguyen
(74) *Attorney, Agent, or Firm* — Quinn IP Law

(57) ABSTRACT

An engine assembly with an air intake system and a turbocharger device in fluid communication with the air intake system includes an electronic control unit in communication with the air intake system and turbocharger device. A CAC system is in downstream fluid communication with the turbocharger device and in upstream fluid communication with the air intake system and includes at least one flow adjustment mechanism in communication with the electronic control unit and selectively positionable between a first position and one or more second positions to adjust velocity of air from the turbocharger device flowing through the CAC system and to manage condensation buildup in the CAC system and/or to open a bypass duct in order for some or all of the turbo airflow to bypass the CAC system to reduce or eliminate condensation buildup in the CAC system at warm ambient conditions and ice buildup at cold ambient conditions.

18 Claims, 3 Drawing Sheets

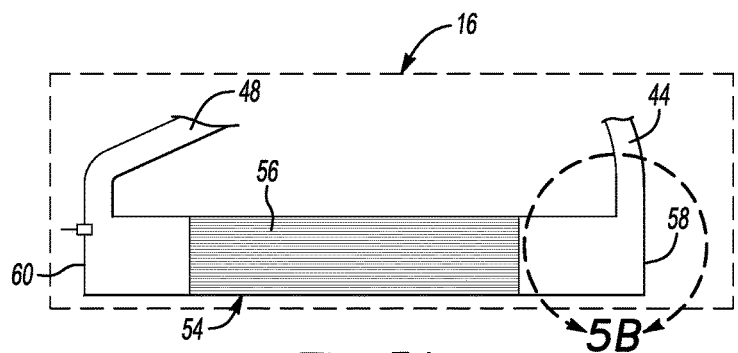
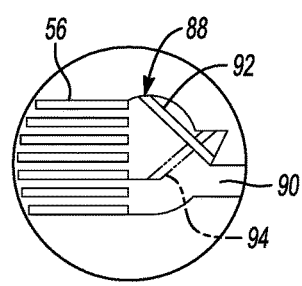
Fig-5A  Fig-5B
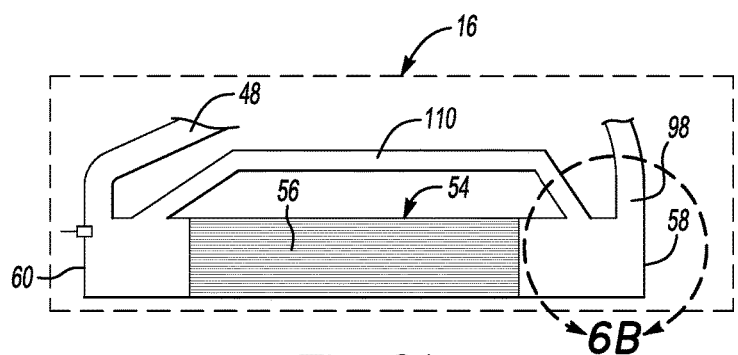
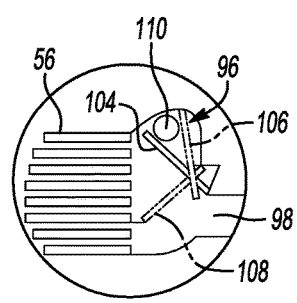
Fig-6A  Fig-6B
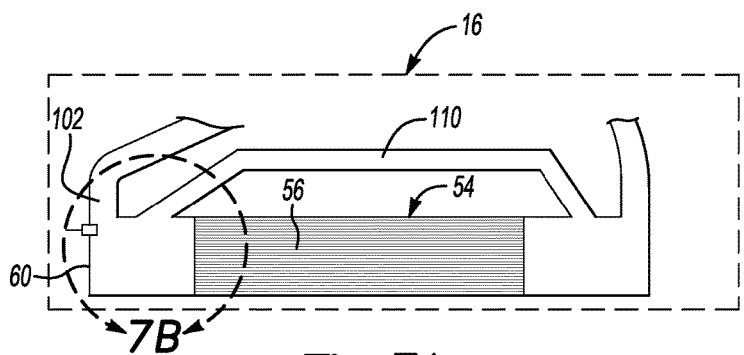
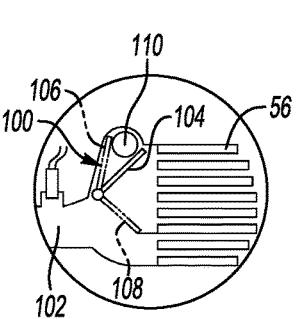
Fig-7A  Fig-7B

CONDENSATION CONTROL SYSTEM FOR INTERNAL COMBUSTION ENGINE

TECHNICAL FIELD

This disclosure relates generally to internal combustion engines, and more specifically to internal combustion engine assemblies equipped with a condensation control system for engines incorporating a turbocharging device and a charge air cooler system.

BACKGROUND

Internal combustion engines are often called upon to generate considerable levels of power for prolonged periods of time on a dependable basis. Many such internal combustion engine assemblies employ a mechanical turbocharging or supercharging device, such as a turbocharger or a turbine driven, forced induction turbocharger or supercharger, to compress the airflow before it enters the intake manifold of the engine in order to adjust power and efficiency. Specifically, a turbocharger is a gas compressor that forces more air and, thus, more oxygen into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power.

Under extreme operating conditions, the "turbocharging" or "supercharging" process may elevate the temperatures of the intake air to an extent that pre-determination of the fuel/air charge prior to timed spark ignition may occur and potentially damage the engine. To combat this problem, engine manufacturers have historically employed a device most commonly known as an intercooler, but more appropriately identified as a charge air cooler (CAC) or aftercooler, to extract heat from the air exiting the turbocharging or supercharging device. A CAC is a heat exchange device used to cool the air charge and, thus, further improve volumetric efficiency of the engine by increasing intake air charge density through cooling. A decrease in air intake temperature provides a denser intake charge to the engine and allows more air and fuel to be combusted per engine cycle, increasing the output of the engine.

The heat exchange process can cause moisture to condense and, thus, form inside the CAC system, especially when conducted in conditions where the ambient air flowing through the turbocharging or supercharging device and CAC is substantially humid, such as greater than 90% relative humidity, and if external airflow, which cools the CAC, is relatively high and internal airflow, from the turbocharger, is relatively low. The condensation may accumulate either in the CAC itself and/or downstream from the CAC, within the conduit through which the intake manifold receives the turbocharged or supercharged airflow. The liquefied condensation can be drawn into the intake manifold, such as when the driver commands an acceleration, and enters the various cylinder combustion chambers. Depending upon the configuration of the CAC and the turbocharging or supercharging devices, as well as their individual and relative packaging, the condensation may enter the combustion chambers in sufficient amounts, potentially causing the engine to misfire, leading to premature engine system component wear, such as the catalytic converter, and trigger a service engine indicator light.

Some CAC systems may include a condensate reservoir or tank configured to collect water condensation. However, accumulated condensate that is not properly evacuated from a CAC can freeze when ambient temperatures reach below freezing, affecting the operation of the CAC. In addition, there may be operating conditions with some vehicle/engine systems which may cause the engine's Positive Crankcase Ventilation (PCV) system to vent crankcase moisture directly into the Turbocharger and CAC. During cold ambient conditions, such moisture may freeze inside the CAC and cause ice accumulation inside the CAC, increasing the internal air pressure drop of the CAC and eventually restricting the engine from receiving the necessary amount of airflow. Such a condition may result in insufficient Turbo Boost pressure at the inlet to the engine, triggering a service engine indicator light.

SUMMARY

According to one embodiment of the disclosure, an internal combustion engine assembly with an air intake system and a turbocharger device in fluid communication with the air intake system includes an electronic control unit in communication with the air intake system and turbocharger device. A charge air cooler system (CAC) is in downstream fluid communication with the turbocharger device and in upstream fluid communication with the air intake system.

At least one flow adjustment mechanism in communication with the electronic control unit and selectively positionable between a first position and one or more second positions to adjust velocity of air from the turbocharger device flowing through the CAC system and to manage condensation buildup in the CAC system. In one embodiment of the disclosure, the at least one flow adjustment mechanism of the CAC system includes a valve selectively positionable between the first position and a second substantially closed position restricting the flow of air from the turbocharger device therethrough.

The valve of the at least one flow adjustment mechanism may be disposed on an induction duct in fluid communication with an exhaust portion of the CAC system and an air intake manifold of the air intake system. Alternatively, the valve of the at least one flow adjustment mechanism may be integrally formed to an opening in the exhaust portion of the CAC system and in fluid communication with the air intake manifold of the air intake system through the induction duct.

In another embodiment of the disclosure, the at least one flow adjustment mechanism of the CAC system includes a flap disposed within the CAC system and adjacent to the exhaust portion that is selectively positionable between the first position and one or more second actuated positions to restrict the flow of air through the turbocharger device to the air intake system. In yet another embodiment of the disclosure, the at least one flow adjustment mechanism of the CAC system further comprises a flap disposed within the CAC system and adjacent to an intake portion that is selectively positionable between the first position and one or more second actuated positions to restrict the flow of air through the turbocharger device to the air intake system.

The electronic control unit of the internal combustion engine assembly may be in communication with one or more sensors in the engine assembly. A manifold absolute pressure (MAP) sensor may be operatively coupled to the intake manifold such that the MAP sensor is capable of monitoring an intake manifold pressure. A manifold airflow (MAF) sensor may be operatively coupled to the clean air filter or clean air duct, such that the MAF sensor is capable of monitoring mass airflow entering the turbocharger. A manifold air temperature (MAT) sensor may be operatively coupled to the intake manifold such that the MAT sensor is capable of monitoring an intake manifold temperature.

An internal combustion engine assembly having an engine block may comprise an exhaust system including an exhaust manifold in fluid communication with the engine block to receive and expel exhaust gases therefrom. A throttle body creating a pressure gradient when the internal combustion engine is in an on-state may be in fluid communication with an intake manifold of an air intake system. A turbocharger device in fluid communication with the air intake system is configured to provide compressed airflow to the air intake system.

An electronic control unit is provided in communication with the air intake system and turbocharger device. A CAC system in downstream fluid communication with the turbocharger device and in upstream fluid communication with the air intake system includes at least one flow adjustment mechanism in communication with the electronic control unit and selectively positionable between a first position and one or more second positions to adjust velocity of air from the turbocharger device flowing through the CAC system and to manage condensation buildup in the CAC system.

In one embodiment of the disclosure, the at least one flow adjustment mechanism of the CAC system includes a valve selectively positionable between the first position and a second substantially closed position restricting the flow of air from the turbocharger device therethrough. The valve may be disposed on an induction duct in fluid communication with an exhaust portion of the CAC system and an air intake manifold of the air intake system. Alternatively, the valve may be integrally formed to an opening in the exhaust portion of the CAC system and in fluid communication with the air intake manifold of the air intake system through the induction duct.

In another embodiment of the disclosure, the at least one flow adjustment mechanism of the CAC system further comprises a flap disposed within the CAC system and adjacent to the exhaust portion that is selectively positionable between the first position and one or more second actuated positions to restrict the flow of air through the turbocharger device to the air intake system. Alternatively, the at least one flow adjustment mechanism of the CAC system further comprises a flap disposed within the CAC system and adjacent to an intake portion that is selectively positionable between the first position and one or more second actuated positions to restrict the flow of air through the turbocharger device to the air intake system.

The electronic control unit of the internal combustion engine assembly may be in communication with one or more sensors in the engine assembly. A manifold absolute pressure (MAP) sensor may be operatively coupled to the intake manifold such that the MAP sensor is capable of monitoring an intake manifold pressure. A manifold airflow (MAF) sensor may be operatively coupled to the intake manifold such that the MAF sensor is capable of monitoring mass airflow in the intake manifold. A manifold air temperature (MAT) sensor may be operatively coupled to the intake manifold such that the MAT sensor is capable of monitoring an intake manifold temperature.

In another embodiment of the disclosure, a CAC system may be provided in fluid communication with an air intake system and turbocharger device of an internal combustion engine assembly. The system may include an electronic control unit in communication with the air intake system and turbocharger device. The CAC system housing includes an inlet portion at a first end in fluid communication with the turbocharger device, an exhaust portion in an opposing second end in fluid communication with the air intake system and a cavity defined therebetween.

At least one flow adjustment mechanism is in communication with the electronic control unit and selectively positionable between a first position and one or more second positions to adjust velocity of air from the turbocharger device flowing through the CAC system and to manage condensation buildup in the CAC system. In one embodiment of the disclosure, the at least one flow adjustment mechanism of the CAC system includes a valve selectively positionable between the first position and a second substantially closed position restricting the flow of air from the turbocharger device therethrough.

The valve of the at least one flow adjustment mechanism may be disposed on an induction duct in fluid communication with an exhaust portion of the CAC system and an air intake manifold of the air intake system. Alternatively, the valve may be integrally formed to an opening in the exhaust portion of the CAC system and in fluid communication with the air intake manifold of the air intake system through the induction duct.

The at least one flow adjustment mechanism of the CAC system may include a flap disposed within the CAC system and adjacent to the exhaust portion that is selectively positionable between the first position and one or more second actuated positions to restrict the flow of air through the turbocharger device to the air intake system. Alternatively, the at least one flow adjustment mechanism of the CAC system may include a flap disposed within the CAC system and adjacent to an intake portion that is selectively positionable between the first position and one or more second actuated positions to restrict the flow of air through the turbocharger device to the air intake system.

The above features and advantages, and other features and advantages of the disclosure, will be readily apparent from the following detailed description of the preferred embodiments and best modes for carrying out the disclosure when taken in connection with the accompanying drawings and appended claims.

BRIEF DESCRIPTION OF THE DRAWINGS

FIG. 5A is a plan view of another variant of a CAC system for use with the disclosure;

FIG. 5B is a plan view of a flow adjustment mechanism incorporated in the CAC system along section 5B in FIG. 5A;

FIG. 6A is a plan view of yet another variant of a CAC system for use with the disclosure;

FIG. 6B is a plan view of a flow adjustment mechanism incorporated in the CAC system along section 6B in FIG. 6A;

FIG. 7A is a plan view of another variant of a CAC system for use with the disclosure; and FIG. 7B is a plan view of a flow adjustment mechanism incorporated in the CAC system along section 7B in FIG. 7A in accordance with the disclosure.

DETAILED DESCRIPTION

Figure 1:
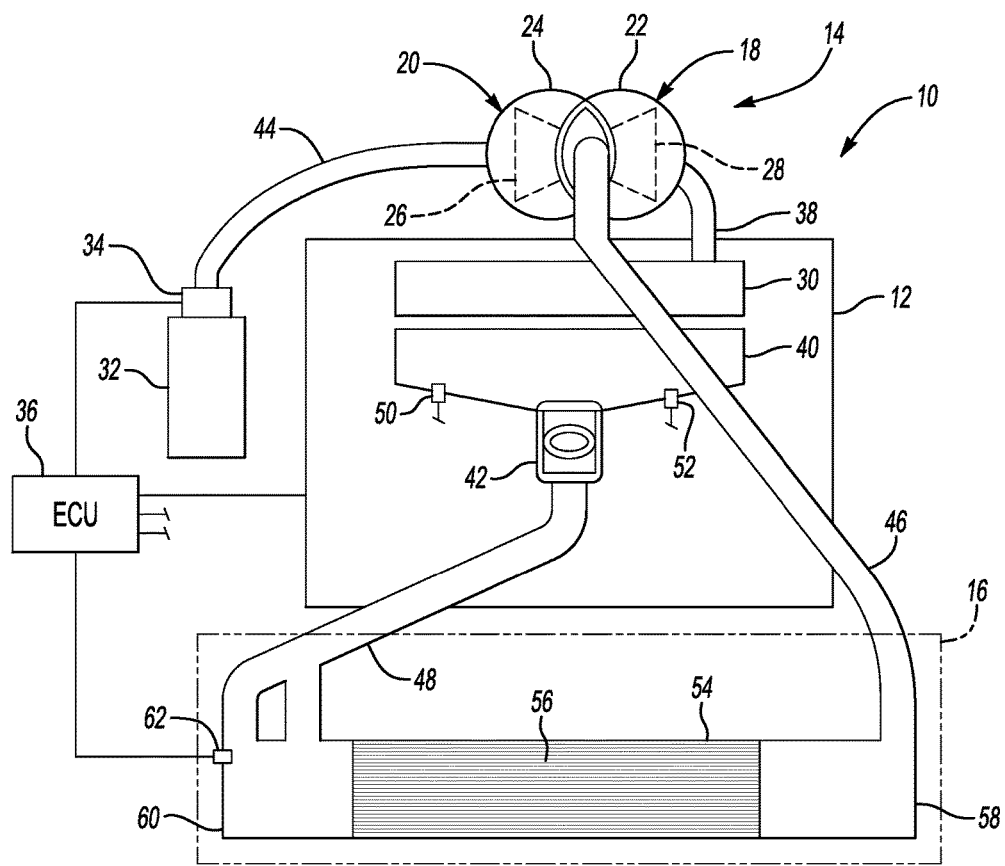
FIG. 1 is a schematic illustration of an internal combustion engine assembly equipped with a turbocharge device and a CAC system having a condensation control system in accordance with the disclosure.

Reference will now be made in detail to several embodiments of the disclosure that are illustrated in the accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring to the drawings, wherein like reference numbers refer to like components throughout the several views, FIG. 1 is a schematic illustration of a representative internal combustion engine assembly, identified generally as 10, with which the disclosure may be utilized. It should be readily understood that FIG. 1 is merely an exemplary application by which the disclosure may be practiced. As such, the disclosure is by no means limited to the particular engine configuration of FIG. 1. In addition, the drawings presented herein are not to scale and are provided purely for instructional purposes. Thus, the specific and relative dimensions shown in the drawings are not to be considered limiting.

The internal combustion engine assembly 10 may be provided in a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation device. Engine assembly 10 may include an engine block, crankcase and cylinder head, indicated collectively at 12, equipped with a turbocharging or supercharging device, represented herein by a turbocharger device 14, and a CAC system 16.

Notably, the engine block, crankcase and cylinder head 12, turbocharger device 14, and CAC system 16 shown in FIG. 1 hereof have been greatly simplified, it being understood that further information regarding such systems may be found in the prior art. In addition, those skilled in the art will recognize that the engine block, crankcase and cylinder head 12 may be integrally formed as depicted in FIG. 1, or be pre-fabricated as individual components that are subsequently connected, e.g., by bolting or other fastening method. Finally, the engine assembly 10 may operate in a compression ignited or spark ignited combustion mode within the scope of the disclosure claimed herein.

With continued reference to FIG. 1, the engine assembly 10 includes an exhaust manifold or header 30 configured to receive and expel exhaust gases therefrom. For example, the cylinder block portion of the engine block and cylinder head 12 defines a plurality of exhaust ports (not shown) through which exhaust gases or products of combustion are selectively evacuated from a plurality of variable volume combustion chambers (not shown). The exhaust ports communicate the exhaust gases to the exhaust and exhaust system including an exhaust manifold 30, which is defined within the cylinder head portion of the engine block and cylinder head 12.

The engine assembly 10 also includes an air intake system, which is represented herein by an intake manifold or inlet manifold 40 in downstream fluid communication with a throttle body 42. The throttle body 42 is operable to control the amount of air flowing into the engine, normally in response to driver input. The intake manifold 40, on the other hand, is responsible for supplying the fuel/air mixture to the variable volume combustion chambers. The throttle body 42 creates a pressure gradient when the engine assembly 10 is in an on-state.

The turbocharger device 14 is in fluid communication with the engine assembly 10. More specifically, the turbocharger device 14 includes a turbine portion 18 and a compressor portion 20. The turbine portion 18 has a turbine housing 22, which is in fluid communication with the exhaust manifold 30 via exhaust line 38. The turbine housing 22 redirects the flowing exhaust stream to spin a turbine blade or impeller, shown hidden in FIG. 1 at 28, rotatably mounted therein.

The compressor portion 20 has a compressor housing 24 with a compressor blade, shown hidden in FIG. 1 at 26, rotatably mounted therein. Inlet air is received by the compressor housing 24 from a clean air filter 32 via clean air duct 44. The turbine blade 28 is rigidly mounted to the compressor blade 26 for unitary rotation therewith. As the compressor blade 26 spins, air received from air filter 32 is compressed within the compressor housing 24.

Air compressed by the compressor portion 20 is communicated by compressor output duct or CAC inlet duct 46 to the CAC system 16, the compressor housing 24 being in upstream fluid communication with the CAC system 16. Those skilled in the art will recognize that the disclosure may incorporate a single turbocharger, twin turbochargers, staged turbochargers, or various other engine turbocharging or supercharging devices without departing from the intended scope of the disclosure.

Still referring to FIG. 1 of the drawings, a MAF sensor 34 is positioned between the clean air filter 32 and clean air duct 44. The MAF sensor 34 is used to determine the mass air flow or mass of fresh air entering the engine assembly 10, such as through the compressor portion 20 of turbocharger device 14, and communicate this information to an engine control module or unit (ECU) 36. The air mass information is necessary for the ECU 36 to calculate and deliver the correct fuel mass to the intake manifold 40. The ECU 36 is in communication with one or more components of the engine assembly 10, including, but not limited to, the air intake system, turbocharger device 14 and CAC system 16.

The charge air output is routed from the compressor portion 20 of the turbocharger device 14 through the CAC or aftercooler system 16 before entering the intake manifold 40. To this regard, the CAC system 16 is positioned in downstream fluid communication with the turbocharger device 14, and in upstream fluid communication with the air intake system, including the air intake manifold 40 and throttle body 42. The CAC system 16 is configured to extract heat from compressed airflow or cool the air charge exiting the turbocharger device 14. Although condensate buildup is a phenomena normally associated with air-to-air charge air cooler devices, the CAC system 16 may also be of the air-to-liquid type heat exchanger.

The engine intake manifold 40 may include a MAP sensor 50 monitors intake manifold absolute pressure and ambient barometric pressure within the intake manifold. Preferably the MAP sensor 50 may be configured to monitor positive and negative pressures, and is thus able to monitor boost pressure in the intake manifold 40. A MAT sensor 52 monitors intake manifold air temperature. Other sensors and monitoring schemes may be employed for purposes of control and diagnostics. For example, exhaust gas sensors may monitor one or more exhaust gas parameters, e.g., air/fuel ratio, and exhaust gas constituents, and may be used as feedback for control and diagnostics and a combustion pressure sensor may be configured to monitor cylinder pressure, from which a mean-effective pressure or another suitable combustion parameter may be determined.

The CAC system 16 includes a CAC tank or housing 54 having an inlet portion at a first end 58 in fluid communication with the turbocharger device 14, an outlet portion in an opposing second end 60 in fluid communication with the air intake manifold 40 and a cavity defined therebetween. The cavity may be configured to receive a heat exchange core assembly 56 between the first end 58 and second end 60 of the housing 54. The first end 58 of the housing 54 may also be referred to as the "hot-end" or "upstream-end", while the second end 60 of the housing 54 may also be referred to as the "cold-end" or "downstream-end." The upstream or first end 58 provides a transition to allow the intake air from the turbocharger device 14 to flow from the compressor output duct 46 into the inner cooling tubes of the heat exchange core assembly 56 of the CAC system 16. The pressure of air at an inlet of the throttle 42 may be measured using a throttle inlet air pressure (TIAP) sensor 62. The TIAP sensor 62 may be located downstream from the throttle 42.

The upstream or first end 58 may be in upstream fluid communication with the downstream or second end 60 of the housing 54. The downstream end tank 60 provides a transition to allow the intake air to flow from the tubes of the CAC system 16 to an induction duct 48, for transfer to the throttle body 42. The throttle body 42 creates a pressure gradient when the engine assembly 10 is in an on-state. "Engine misfire" is a phenomena that may occur when a threshold volume of water condensation builds up inside of the CAC system 16, which is then ingested in undesirable volumes into the intake manifold 40 due a sudden increase in turbocharger airflow and air pressure, in response to the driver requesting a sudden acceleration of the vehicle.

Referring now to FIGS. 2-7, one or more variants of the CAC system 16 for use with the engine assembly of the disclosure will be discussed in greater detail. It is understood that each of the variants of the CAC system 16 illustrated in FIGS. 2-7 may be used with the internal combustion engine assembly 10 to accomplish the objectives of the disclosure.

Figure 2:
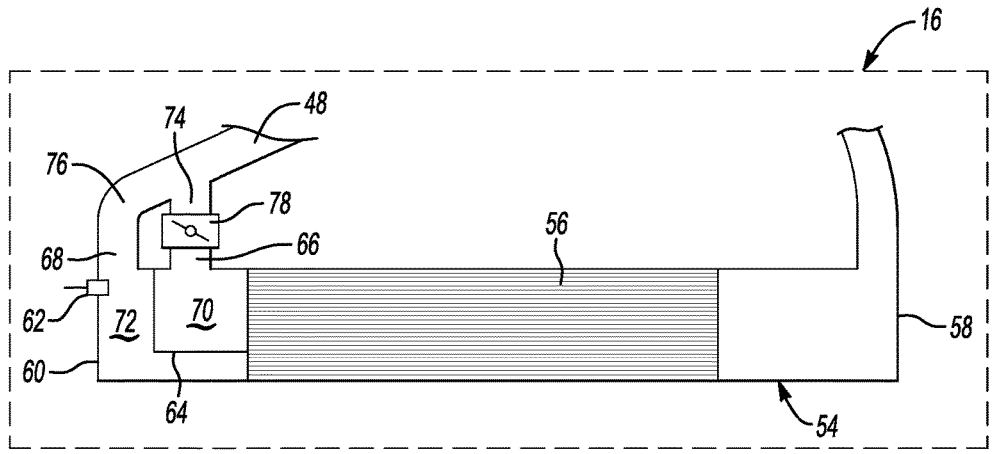
FIG. 2 is a plan view of a first variant of a CAC system for use with the disclosure.

FIG. 2 illustrates a first variant of the CAC system of the disclosure. The second end 60 of the housing 54 of CAC system 16 includes an interior wall 64 extending at least partially through the interior of the housing 54. The second end 60 of the housing 54 may be configured to include a first vent or outlet portion 66 and a corresponding second vent or outlet portion 68. In one embodiment of the disclosure, interior wall 64 may be disposed between the first and second vent or outlet portion 66, 68 such that the interior wall cooperates with the housing 54 to create a first flow path 70 cooperating with the first vent 66 and a second flow path 72 cooperating with the second vent 68.

First flow path 70 and second flow path 72 in the housing 54 direct air flow from the CAC system 16 toward the first and second vents 66, 68. Induction duct 48 may include first and second channels 74, 76 respectively that are in fluid communication with the first and second vents 66, 68 to direct the air flow to the throttle 42. The CAC system 16, as also illustrated in FIG. 1, may include at least one flow adjustment mechanism 78 in communication with the ECU 36 and selectively positionable between a first position and one or more second positions to adjust velocity of air from the turbocharger device 14 flowing through the CAC system 16 and to manage condensation buildup in the CAC system 16.

The at least one flow adjustment mechanism illustrated in FIG. 2 is a valve 78 that may be disposed on and cooperate with the induction duct 48. Valve 78 is selectively adjustable between a first or at least one open position, wherein air flow travels through the valve 78, and one or more second or substantially closed positions, wherein air flow does not pass through the valve 78. In the embodiment illustrated in FIG. 2, valve 78 is disposed on first channel 74 of the induction duct 48, though it is understood that the valve 78 could be disposed on the second channel 76 of the induction duct 48 to achieve the objectives of the disclosure.

Figure 3:
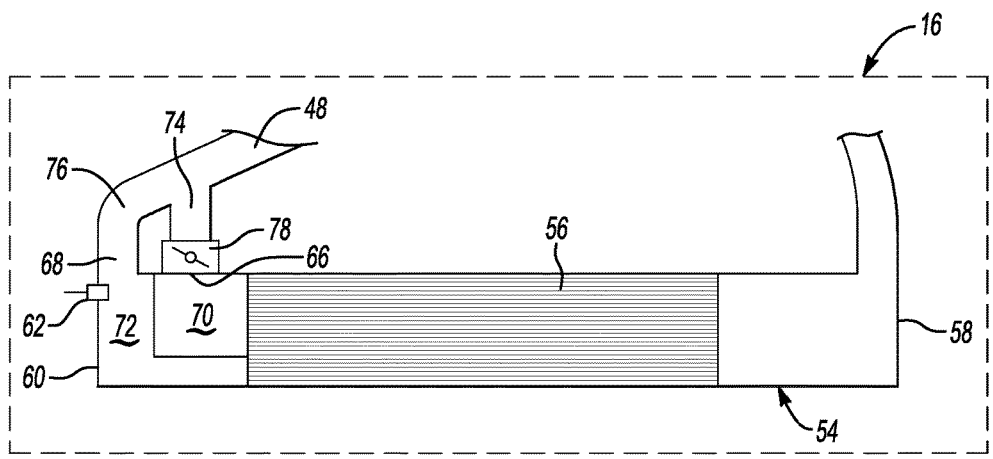
FIG. 3 is a plan view of another variant of a CAC system for use with the disclosure.

Alternatively, as is illustrated in FIG. 3, valve 78 may be secured to or integrally formed to the exterior of the second end 60 of the housing 54 of the CAC system 16 and in fluid communication with the induction duct 48 to selectively restrict air flow through the valve 78 from the CAC system 16 to the throttle. As will be described in greater detail below, valve 78 may be operably connected the ECU 36 shown in FIG. 1 and movable between the first position and the one or more second or substantially closed positions to adjust the velocity of air flow through the second flow path 70 and adjust air velocity flowing through the heat exchange core assembly 56 to manage condensation build up within the CAC system 16.

Figure 4:
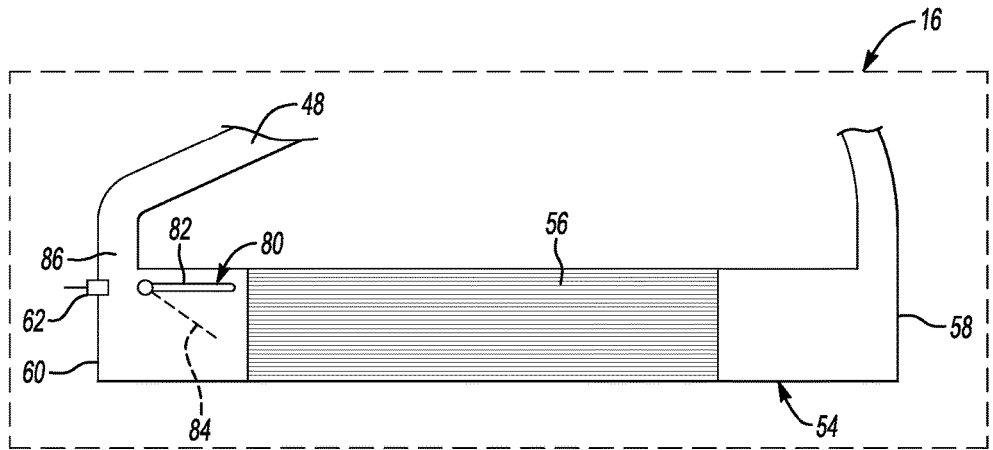
FIG. 4 is a plan view of yet another variant of a CAC system for use with the disclosure.

Referring now to FIG. 4, another variant of the CAC system 16 for use with the internal combustion engine 10 is disclosed. The at least one flow adjustment mechanism is a flap or projection 80 that may be adjustably mounted within an interior cavity adjacent a second end 60 of the housing 54 of CAC system 16. Flap or projection 80 may be disposed adjacent the heat exchange core assembly 56 and an opening 86 in the second end 60 of the housing 54. Projection 80 is selectively adjustable between a first or stored position 82 and one or more second or engaged positions represented generally by dotted line 84 by the ECU. When projection 80 is placed in the at least one engaged position 84, projection 80 selectively restricts air flow from the heat exchange core assembly 56 toward the opening 86 cooperating with the induction duct 48 to adjust the velocity of air flow through the heat exchanger core assembly 56 and to manage condensation build up within the CAC system 16.

Referring now to FIGS. 5-6, CAC system 16 may include other variants of the at least one flow adjustment mechanism wherein a valve assembly is provided adjacent a first end 58 of the housing 54 of the CAC system 16 to manage condensation buildup within the CAC system 16. FIGS. 5A-5B illustrate a CAC system 16 incorporating a valve or flap 88 adjustably positioned and disposed adjacent an inlet opening 90 in the first end 58 of the housing 54 and the heat exchange core assembly 56 of the CAC system 16.

As is shown in greater detail in FIG. 5B along section 5B of FIG. 5A, flap 88 may be selectively positionable between a first or stored position 92 and one or more second or engaged positions represented by line 94 by the ECU. When the flap 88 is placed in the one or more engaged positions 94, flap 88 restricts air flow from the air duct 44 into the first end 58 of the housing to adjust the velocity of air flow through the heat exchanger core assembly 56 and to manage condensation build up within the CAC system.

Referring now to FIGS. 6A-6B, another variant of CAC system 16 incorporates at least one flow adjustment mechanism that is a valve or flap 96 that is disposed adjacent and may be selectively positioned relative to an inlet opening 98 in the first end 58 of the housing 54 and the heat exchange core assembly 56 of the CAC system 16. As is shown in greater detail in FIG. 6B along section 6B of FIG. 6A, flap 96 may be selectively adjustable between one or more positions in response to control signals from the ECU. A similar arrangement is shown in FIGS. 7A-7B, wherein a flap 100 may be disposed adjacent an opening 102 in the second end 60 of the housing 54 of CAC system 16 and may be selectively adjustable between one or more positions in response to control signals from the ECU 36.

The flap 96 shown in FIGS. 6A-6B and flap 100 shown in FIGS. 7A-7B may be selectively positioned by the ECU between a first position shown as number 104, wherein the flap 96, 100 allows the CAC system 16 to operate without restrictions and one or more active modes and one or more second positions. In one or the second positions generally shown as number 106, the flap 96, 100 is moved to a position adjacent the housing 54 of the CAC system 16 such that a bypass flow is created through duct 110 to reduce the risk of an icing condition in the CAC system 16 and to reduce or eliminate condensation buildup in the CAC system 16 at warm ambient conditions and ice buildup at cold ambient conditions. In another of the second positions generally shown as number 108 along section 7B of FIG. 7A, the flap 96, 100 is moved to a position 108 adjacent the heat exchange core assembly 56 to adjust the velocity of air flow through the heat exchanger core assembly 56 and to manage condensation build up within the CAC system 16.

The ECU, in response to information collected by one or more sensors, is in communication with and operably connected to the at least one flow adjustment mechanism to selectively position the flow adjustment mechanism in response to the sensor output. For example, the ECU may be in communication with a MAP sensor operatively coupled to the intake manifold such that the MAP sensor is capable of monitoring an intake manifold pressure. The ECU may be in communication with a MAF sensor operatively coupled to the air cleaner or clean air duct such that the MAF sensor is capable of monitoring mass airflow into the turbocharger.

Alternatively, the ECU may be in communication with a mass airflow sensor disposed between the engine air inlet and filter and the turbocharger device to measure air or ambient temperature and ambient humidity conditions. Further, the ECU may be in communication with a MAT sensor operatively coupled to the intake manifold such that the MAT sensor is capable of monitoring an intake manifold temperature.

Condensation may gather inside a CAC system in a high humidity environment as detected by the mass airflow sensor and where the air flow is reduced through the CAC system as a result of continuous low engine airflow as detected by the MAF sensor. The moisture resulting from condensation may create a potential engine misfire if the engine output is increased in response to a vehicle acceleration condition. An icing condition may exist in a CAC system where the ambient temperature of the environment in which the engine operates is below about minus ten (−10) degrees Celsius as detected by the mass airflow sensor and where the engine PCV system is venting crankcase moisture into the turbocharger and CAC system. Moisture from the PCV system may then freeze inside the CAC, increasing CAC internal air pressure drop and eventually causing a turbo underboost condition.

In one embodiment of the disclosure, the ECU will selectively position the at least one flow adjustment mechanism to a position which allows turbocharger airflow to completely bypass the CAC system. The ECU will detect an icing condition when the ambient air temperature detected by the mass airflow sensor is below about minus ten (−10) degrees Celsius. Upon detection of this condition, the ECU will then determine if the MAT sensor or air temperature from the TIAP sensor is detected below about zero degrees Celsius and if the MAP sensor detects a pressure above which the PCV system vents crankcase moisture into the CAC system, the ECU will adjust the at least one flow adjustment mechanism to a position which substantially bypasses the CAC system.

Alternatively, the ECU will selectively position the at least one flow adjustment mechanism in a substantially closed position to reduce the number of active cooling tubes in the heat exchange core assembly to adjust the air velocity and to manage condensation inside the CAC system when a condensation condition may exist. The ECU will detect a condensation condition when the ambient air temperature detected by the mass airflow sensor is above zero (0) degrees Celsius and the engine air inlet humidity or ambient humidity is high. Upon detection of this condition, if the MAF sensor detects that engine airflow is low and the MAT sensor or air temperature from the TIAP sensor is detected below about thirty-five (35) degrees Celsius, the ECU will adjust the at least one flow adjustment mechanism to a substantially closed position.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the scope of the appended claims.

The invention claimed is:

1. An internal combustion engine assembly, comprising:
   an air intake system;
   a turbocharger device in fluid communication with the air intake system;
   a throttle body creating a pressure gradient when the internal combustion engine assembly is in an on-state;
   an electronic control unit in communication with the air intake system, the turbocharger device, and one or more sensors in the engine assembly, wherein the one or more sensors in the engine assembly include:
      a manifold absolute pressure sensor operatively coupled to an intake manifold such that the manifold absolute pressure sensor is capable of monitoring an intake manifold pressure,
      a manifold air temperature sensor operatively coupled to the intake manifold such that the manifold air temperature sensor is capable of monitoring an intake manifold temperature,
      a manifold airflow sensor operatively coupled to an air cleaner or clean air duct such that the manifold airflow sensor is capable of monitoring mass airflow into the turbocharger device, and
      a throttle inlet air pressure sensor cooperating with the throttle body such that the throttle inlet air pressure sensor is capable of monitoring temperature and pressure of air at an inlet of the throttle body;

a charge air cooler system in downstream fluid communication with the turbocharger device and in upstream fluid communication with the air intake system; and at least one valve in communication with the electronic control unit and selectively positionable between a first position and one or more second positions to adjust velocity of air from the turbocharger device flowing through the charge air cooler system to manage condensation buildup in the charge air cooler system, wherein the electronic control unit positions the at least one valve in the one or more second positions to adjust the velocity of air flowing through the charge air cooler system when ambient air temperature detected by the mass airflow sensor is below zero degrees Celsius and air temperature from the throttle air inlet pressure sensor is detected below thirty-five degrees Celsius.

2. The internal combustion engine assembly of claim 1, wherein the at least one valve of the charge air cooler system is selectively positionable between the first position and the one or more second closed positions to restrict the flow of air from the turbocharger device therethrough.

3. The internal combustion engine assembly of claim 2, wherein the at least one valve is disposed on an induction duct in fluid communication with an exhaust portion of the charge air cooler system and an air intake manifold of the air intake system.

4. The internal combustion engine assembly of claim 2, wherein the at least one valve is integrally formed to an opening in the exhaust portion of the charge air cooler system and in fluid communication with the air intake manifold of the air intake system through an induction duct.

5. The internal combustion engine assembly of claim 1, wherein the at least one valve of the charge air cooler system further comprises a flap disposed within the charge air cooler system and adjacent to the exhaust portion that is selectively positionable between the first position and one or more second actuated positions to restrict the flow of air through the turbocharger device to the air intake system.

6. The internal combustion engine assembly of claim 1, wherein the at least one valve of the charge air cooler system further comprises a flap disposed within the charge air cooler system and adjacent to an intake portion that is selectively positionable between the first position and one or more second actuated positions to restrict the flow of air through the turbocharger device to the air intake system.

7. An internal combustion engine assembly having an engine block, comprising:

an exhaust system including an exhaust manifold in fluid communication with the engine block to receive and expel exhaust gases therefrom;

a throttle body creating a pressure gradient when the internal combustion engine is in an on-state;

an air intake system including an intake manifold in downstream fluid communication with the throttle body;

a turbocharger device in fluid communication with the air intake system and configured to provide compressed airflow thereto;

an electronic control unit in communication with the air intake system, the turbocharger device, and one or more sensors in the engine assembly, wherein the one or more sensors in the engine assembly include:

a manifold absolute pressure sensor operatively coupled to an intake manifold such that the manifold absolute pressure sensor is capable of monitoring an intake manifold pressure, a manifold air temperature sensor operatively coupled to the intake manifold such that the manifold air temperature sensor is capable of monitoring an intake manifold temperature, a manifold airflow sensor operatively coupled to an air cleaner or clean air duct such that the manifold airflow sensor is capable of monitoring mass airflow into the turbocharger device, and a throttle inlet air pressure sensor cooperating with the throttle such that the throttle inlet air pressure sensor is capable of monitoring temperature and pressure of air at an inlet of the throttle;

a charge air cooler system in downstream fluid communication with the turbocharger device and in upstream fluid communication with the air intake system, a positive crankcase ventilation system in fluid communication with the turbocharger device and the charge air cooler system; and at least one valve in communication with the electronic control unit and selectively positionable between a first position and one or more second positions to adjust velocity of air from the turbocharger device flowing through the charge air cooler system to manage condensation buildup in the charge air cooler system, wherein the electronic control unit positions the at least one valve in the one or more second positions to adjust the velocity of air flowing through the charge air cooler system when ambient air temperature detected by the mass airflow sensor is below minus ten degrees Celsius, air temperature from the throttle air inlet pressure sensor is detected below zero degrees Celsius and the manifold absolute pressure sensor detects a pressure above which the positive crank ventilation system vents moisture into the charge air cooler system.

8. The internal combustion engine assembly of claim 7, wherein the at least one valve of the charge air cooler system is selectively positionable between the first position and one or more second closed positions restricting the flow of air from the turbocharger device therethrough.

9. The internal combustion engine assembly of claim 8, wherein the at least one valve is disposed on an induction duct in fluid communication with an exhaust portion of the charge air cooler system and an air intake manifold of the air intake system.

10. The internal combustion engine assembly of claim 8, wherein the at least one valve is integrally formed to an opening in the exhaust portion of the charge air cooler system and in fluid communication with the air intake manifold of the air intake system through an induction duct.

11. The internal combustion engine assembly of claim 7, wherein the at least one valve of the charge air cooler system further comprises a flap disposed within the charge air cooler system and adjacent to the exhaust portion that is selectively positionable between the first position and one or more second actuated positions to restrict the flow of air through the turbocharger device to the air intake system.

12. The internal combustion engine assembly of claim 7, wherein the at least one valve of the charge air cooler system further comprises a flap disposed within the charge air cooler system and adjacent to an intake portion that is selectively positionable between the first position and one or more second actuated positions to restrict the flow of air through the turbocharger device to the air intake system.

13. A charge air cooler system in fluid communication with an air intake system and turbocharger device of an internal combustion engine assembly comprising:
- an electronic control unit in communication with the air intake system, the turbocharger device, and one or more sensors in the engine assembly, wherein the one or more sensors in the engine assembly include:
  - a manifold absolute pressure sensor operatively coupled to an intake manifold such that the manifold absolute pressure sensor is capable of monitoring an intake manifold pressure,
  - a manifold air temperature sensor operatively coupled to the intake manifold such that the manifold air temperature sensor is capable of monitoring an intake manifold temperature,
  - a manifold airflow sensor operatively coupled to an air cleaner or clean air duct such that the manifold airflow sensor is capable of monitoring mass airflow into the turbocharger device, and
  - a throttle inlet air pressure sensor cooperating with a throttle of the internal combustion engine assembly such that the throttle inlet air pressure sensor is capable of monitoring temperature and pressure of air at an inlet of the throttle;
- a housing having an inlet portion at a first end in fluid communication with the turbocharger device, an exhaust portion in an opposing second end in fluid communication with the air intake system and a cavity defined therebetween; and
- at least one valve in communication with the electronic control unit and selectively positionable between a first position and one or more second positions to adjust velocity of air from the turbocharger device flowing through the charge air cooler system to manage condensation buildup in the charge air cooler system,
- wherein the electronic control unit positions the at least one valve in the one or more second positions to adjust the velocity of air flowing through the charge air cooler system when ambient air temperature detected by the mass airflow sensor is below zero degrees Celsius and air temperature from the throttle air inlet pressure sensor is detected below thirty-five degrees Celsius.

14. The charge air cooler system of claim 13, wherein the at least one valve of the charge air cooler system is selectively positionable between the first position and one or more second closed positions restricting the flow of air from the turbocharger device therethrough.

15. The charge air cooler system of claim 14, wherein the at least one valve is disposed on an induction duct in fluid communication with an exhaust portion of the charge air cooler system and an air intake manifold of the air intake system.

16. The charge air cooler system of claim 14, wherein the at least one valve is integrally formed to an opening in the exhaust portion of the charge air cooler system and in fluid communication with the air intake manifold of the air intake system through an induction duct.

17. The charge air cooler system of claim 13, wherein the at least one valve of the charge air cooler system further comprises a flap disposed within the charge air cooler system and adjacent to the exhaust portion that is selectively positionable between the first position and one or more second actuated positions to restrict the flow of air through the turbocharger device to the air intake system.

18. The charge air cooler system of claim 13, wherein the at least one valve of the charge air cooler system further comprises a flap disposed within the charge air cooler system and adjacent to an intake portion that is selectively positionable between the first position and one or more second actuated positions to restrict the flow of air through the turbocharger device to the air intake system.

\* \* \* \* \*